United States Patent [19]
Watanabe et al.

[11] Patent Number: 4,810,939
[45] Date of Patent: Mar. 7, 1989

[54] TOP AND BOTTOM PINCUSHION DISTORTIONS CORRECTING CIRCUITS TO BE USED FOR PICTURE TUBE HAVING ASPHERICAL FACE PLATE

[75] Inventors: Toshimitsu Watanabe; Kenji Sato, both of Yokohama, Japan

[73] Assignee: Hitachi, Ltd., Tokyo, Japan

[21] Appl. No.: 128,611

[22] Filed: Dec. 4, 1987

[30] Foreign Application Priority Data

Dec. 12, 1986 [JP] Japan ................... 61-294811

[51] Int. Cl.$^4$ ............................................. H01J 29/56
[52] U.S. Cl. .................................................. 315/371
[58] Field of Search ......................................... 315/371

[56] References Cited
U.S. PATENT DOCUMENTS
4,496,882 1/1985 Oliver et al. .................... 315/371

Primary Examiner—Theodore M. Blum
Attorney, Agent, or Firm—Antonelli, Terry & Wands

[57] ABSTRACT

A top and bottom pincushion distortions correcting circuit suitable for a television receiver using a picture tube having the face plate of aspherical surface. This distortion correcting circuit comprises an adder circuit which adds a parabolic signal of horizontal cycle and a sine wave signal of horizontal cycle with adequate mixture rate and a waveform shaper which converts a saw wave signal of vertical cycle to an S-shaped wave signal. A combining signal obtained from the adder circuit is modulated by the S-shaped wave signal in the balanced modulator. The top and bottom pincushion distortions of raster are corrected by the modulated combining signal. The combining signal corrects pincushion distortions of the top and bottom scanning lines of raster and the S-shaped wave signal is used for correcting the pincushion distortion of internal raster.

7 Claims, 6 Drawing Sheets

TOP AND BOTTOM PINCUSHION DISTORTIONS CORRECTING CIRCUITS TO BE USED FOR PICTURE TUBE HAVING ASPHERICAL FACE PLATE

BACKGROUND OF THE INVENTION

The present invention relates to a raster distortions correcting device to be used for picture tube of a television receiver and particularly to the top and bottom pichcushion distortions correcting circuits which is just suitable for picture tube having the aspherical face plate.

It is known that the pincushion distorsions generated at the top and bottom portions of raster scanning the face plate of picture tube of television receiver can almost be eliminated by modulating a vertical scanning current which flows through a deflection coil with an almost parabolic wave current or sine wave current. As the modulation circuit, a balanced modulator using active elements or a passive cirtcuit using saturable reactor is used in general. The device of this type is disclosed in the Japanese Patent Publication No. 28427/1981 and the Japanese Laid open Patent No. 75379/1983.

However, if a radius of curvature of face plate of picture tube is partially different, residual raster distortion is generated. A device which applies the signal current in resonance on the frequency equal to 2 times the horizontal scanning frequency (Japanese Patent Publication No. 43621/1976) or a device which switches the correcting signal corresponding to the switching of the display duration of video signal (Japanese laid-open patent No. 14025/1981) are proposed in view of further suppressing such residual distortion.

Such prior arts do not result in particular problems in case the face plate of picture tube has a constant radius of curvature or is formed as the flat surface. However, the television receivers having the aspherical face plate are widely put into practical use. Moreover, in the case of television receivers of the projection system, the phosphor screen of face plate of projection tube is formed in the aspherical convex shape in order to make short the optical distance for projection. The television receiver using the picture tube having the aspherical face plate as explained earlier provides a problem that residual distortion becomes very distinctive.

Outline of distortion correction of raster scanning the face plate of the picture tube having the aspherical face plate or the projection tube having the aspherical convex face plate (hereinafter, generally called the aspherical picture tube) is explained with reference to FIG. 5 and FIG. 6.

Figure 5A:
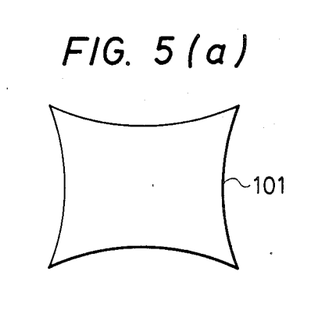
FIG. 5 indicates the pattern indicating the distortion of raster and waveforms of correcting signals.
Figure 5B:
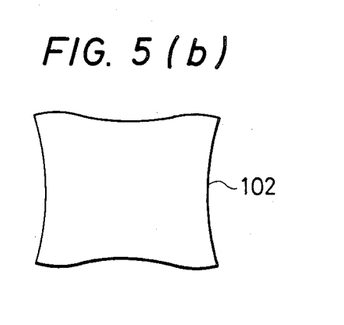
Figure 5C:
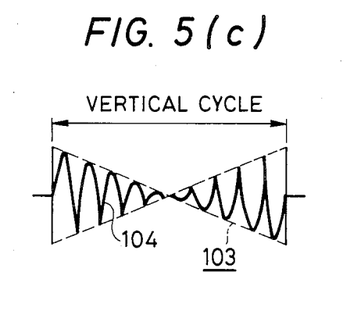

FIG. 5(c) indicates the modulation signal 103 obtained by modulating the parabolic wave signal current 104 of horizontal perid with the saw wave of vertical cycle. In case the top and bottom pincushion distortions of raster are corrected by this modulation signal 103, the raster 102 shows residual raster distortion called the Gull Wing as indicated in FIG. 5(b).

Figure 5D:
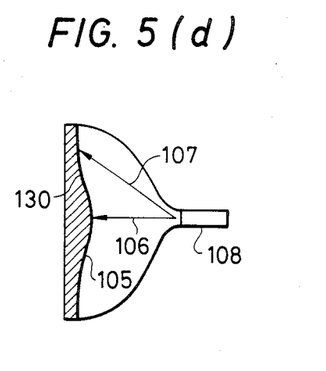
Figure 5E:
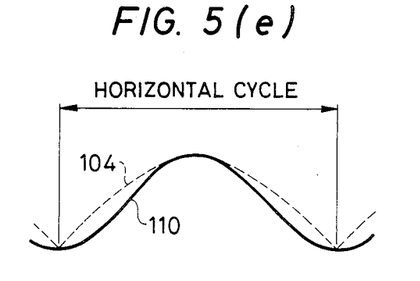

FIG. 5(d) indicates the sectional view of the face plate of picture tube. As will be understood from the relative positional relationship between an electron gun 108 and an aspherical phosphor surface 105, since the radius of curvature at the region 130 where the electron beam 106 and the beam 107 reach changes non-linearly in comparison with the picture tube having the flat or curved face plate, the raster corrected by the parabolic wave current 104 indicated in FIG. 5(e) has the Gull Wing type distortion.

Figure 5F:
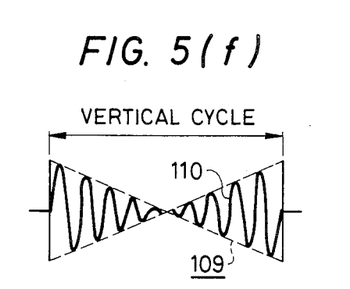

FIG. 5(f) indicates the modulation signal 109 obtianed by modulating the sine wave current 110 of horizontal cycle with the saw wave of vertical cycle. When the top and bottom pincushion distortions are corrected by such modulation signal 109, the raster 111 shows the Napoleon hat type distortion as indicated in FIG. 5(g'). The pincushion distortions are generated in the inner scanning lines even if the top and bottom pincushion distortions of raster are perfectly corrected by the parabolic wave current 104 or sine wave current 110. Such raster distortion is indicated in FIG. 6.

Even when the distortions of top scanning line 112 and bottom scanning line 116 are corrected, the rather internal scanning lines 113, 115 shows the pincushion distortions due to the influence of the aspherical phosphor screen indicated in FIG. 5(d). Therefore, the pincushion distortions must be increased for the scanning lines 113 and 115.

The scanning line 114 at the center naturally does not contain the pinsuchion distortion.

SUMMARY OF THE INVENTION

It is therefore an object of the present invention to provide the top and bottom pincushion distortions correcting circuit which adequately corrects the top and bottom pincushion distortions of picture tube having aspherical face plate.

Figure 5G:
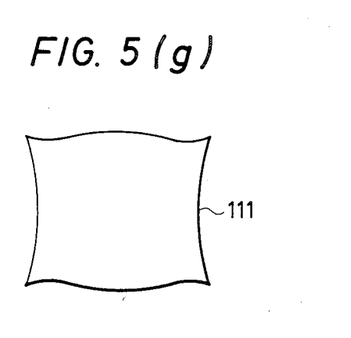

The rasters 102, 111 indicated in FIGS. 5(b), 5(g) show the mutually reversed distortions. Therefore, the distortion of raster on the aspherical picture tube, particularly the distortions of top and bottom scanning lines will be corrected accurately by combining the parabolic signal of horizontal cycle and the sine wave of horizontal cycle with the adequate mixture ratio corresponding to the shape of picture tube having the aspheric surface.

Figure 6:
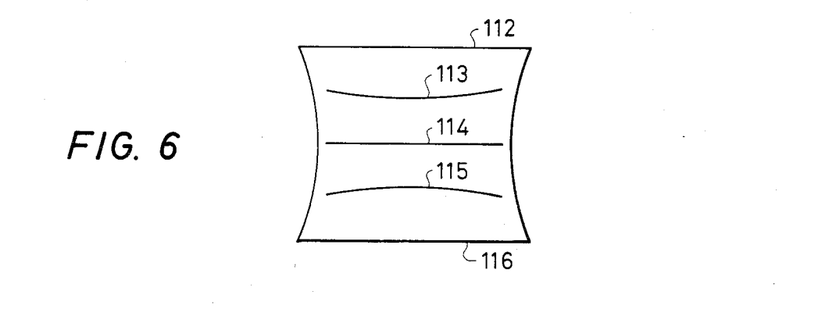
FIG. 6 is a pattern indicating distortions of raster in case the distortions of top and bottom scanning lines of raster are corrected.

As indicated in FIG. 6, the internal scanning lines 113, 115 have the pincushion distortions. The distortions of the scanning lines 113 and 115 may be corrected accurately by increasing the correction degree to the scanning lines 113, 115. In the present invention, distortions of scanning lines 113, 115 are corrected, without changing correction degree for the top and bottom scanning lines, by forming the S-shaped wave as the saw wave of the pvertical cycle.

DETAILED DESCRIPTION OF THE PREFERRED EMBODIMENTS

Figure 1:
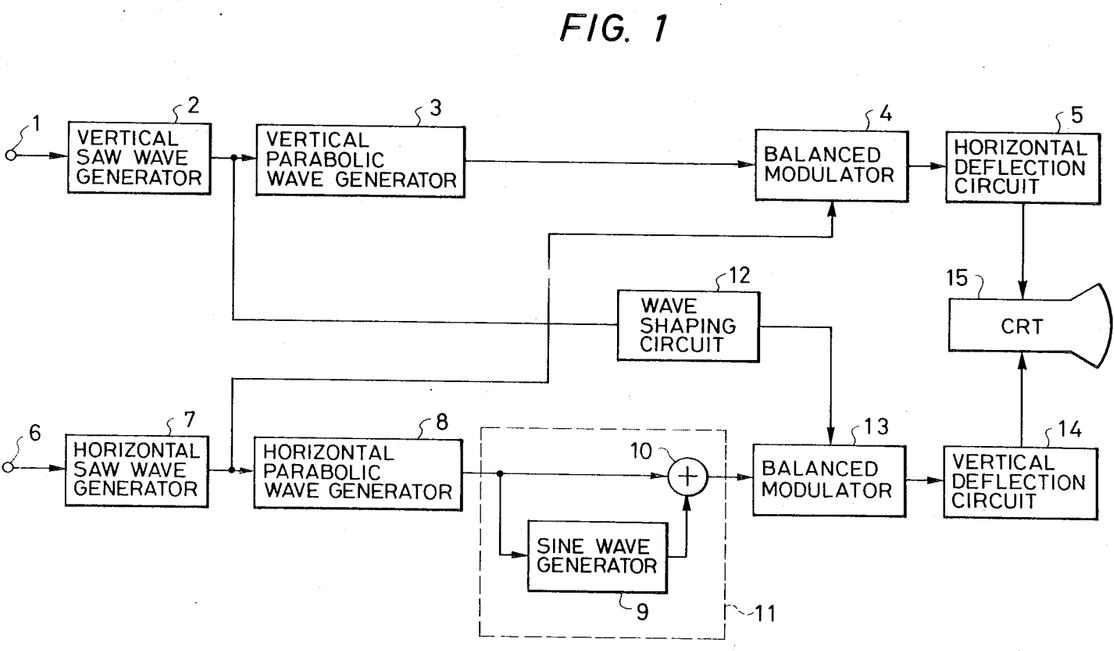
FIG. 1 is a block diagram of television receiver utilizing the top and bottom pincishion distortion correcting circuit of the present invention.

An embodiment of the present invention is explained with reference to FIG. 1. FIG. 1 is a total block diagram of the top and bottom pincushion distortions correcting circuit introducing an embodiment of the present invention.

The top and bottom pincushion distortion correcting circuit of the present invention comprises a vertical synchronous signal input terminal 1, a vertical saw wave generator 2, a horizontal synchronous signal input terminal 6, a horizontal saw wave generator 7, a horizontal parabolic wave generator 8, a sine wave generator 9, an adder circuit 10, a wave shaping circuit 12 and a balanced modulator 13. The vertical parabolic wave generator 3 and balanced modulator 4 form the right and left pincushion distortions correcting circuit. An output signal of the east and west pincushion distortions circuit is supplied to a horizontal deflection circuit.

The horizontal saw wave generator 7 generates a horizontal saw wave signal synchronized with the horizontal synchronous signal supplied to the horizontal synchronous signal input terminal.

The adder circuit 10 and sine wave generating circuit 9 form a signal combining circuit 11. The horizontal parabolic wave generator 8 integrates the horizontal saw wave signal and generates the horizontal parabolic wave signal synchornized with the horizontal synchronous signal input to the horizontal synchronous signal input terminal 6. The sine wave generator 9 generates the horizontal synchronous sine wave signal keeping the predetermined phase relation to the horizontal parabolic wave signal used as the reference signal.

The adder circuit 10 adds the parabolic wave signal and the sine wave signal and then supplies the added combining signal to the balanced modulator 13. Meanwhile, the vertical saw wave generator 2 generates the vertical synchronous saw wave. This saw wave signal is applied to the waveform shaping circuit 12 which shapes the saw wave to the S-shaped wave. This S-shaped wave is then supplied to the other input terminal of the balanced modulator 13. The balanced modulator 13 generates the modulation signal 119 of FIG. 6 (d). This signal 119 is applied to the vertical deflection circuit 14 in order to correct the top and bottom pincushion distortions of raster of picture tube 15.

The signal combining circuit 11 and waveform shaper 12 enclosed by the dashed line is one of the most important circuits of the present invention.

Figure 2A:
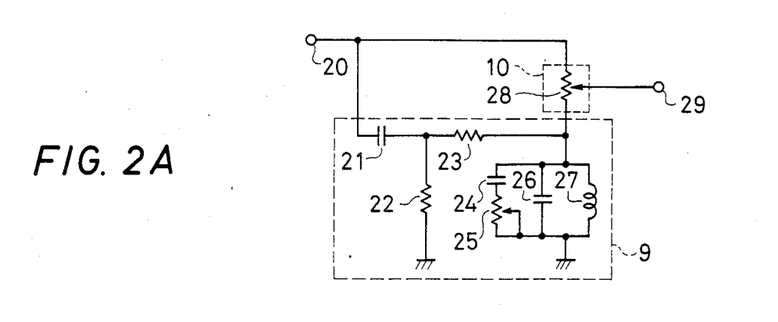
FIG. 2A is a circuit diagram indicating a practical example of structure of the horizontal waveforms combining circuit and FIG. 2B indicates waveforms of respective signals.
Figure 2B:
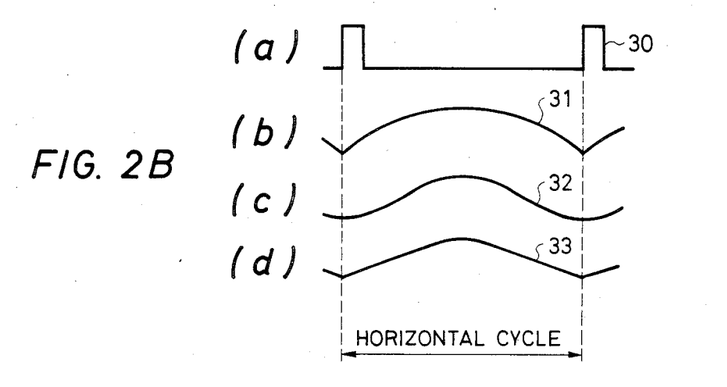

FIG. 2A indicates a practical circuit structure of the signal combining circuit 11. Operations of this circuit structure are explained hereunder. The parabolic signal 31 (FIG. 2B(b)) of horizontal cycle synchronized with the horizontal synchronous signal 30 (FIG. 2B(a)) is supplied to the input terminal 20 and the phase of parabolic signal 31 is led by a differential circuit consisting of a capacitor 21 and a resistor 22. The lead of phase is set to compensate for delay of phase of a resonant circuit connected in the succeeding stage. The parabolic signal 31 which is led in phase actuates a parallel resonance circuit consisting of a coil 27, capacitors 24, 26 and variable resistor 25 through a resistor 23 and thereby the sine wave signal 32 of horizontal cycle indicated in FIG. 2B (c) is generated across the coil 27. When the sine wave 32 is supplied to the fixed terminal of variable resistor 28 while the parabolic signal 31 to the other fixed terminal of variable resistor 28, the signal 33 (FIG. 2B(d)) combining the parabolic signal 31 and sine wave 32 is obtained at the variable terminal, namely the output terminal 29. In the circuit of FIG. 2A, the waveform of combining signal 33 (FIG. 3B(d)) may be changed adequately in accordance with the adjusting position of the variable resistor 28. The variable resistor 25 is used for adjusting the resonance frequency of the parallel resonance circuit.

Figure 3A:
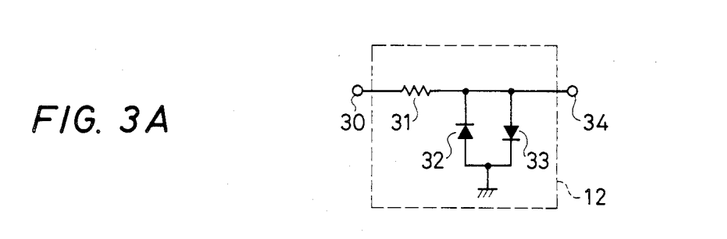
FIG. 3A is a circuit diagram indicating a practical example of structure of waveform shaping circuit and FIG. 3B indicates waveforms of respective signals.
Figure 3B:
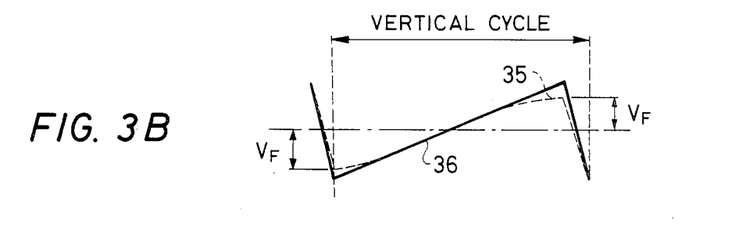

FIG. 3A indicates a practical circuit structure of the wave shaping circuit 12. Operations of this circuit is then explained below. As indicated FIG. 3B, the vertical saw wave signal 36 is applied to the input terminal 30. The vertical saw wave signal 36 having passed the resistor 31 is supplied to the diodes 32, 33. When the threshold voltage of diodes 32, 33 is supposed as $V_F$, if amplitude of the saw wave signal 36 is higher than the level $V_F$, the saw wave signal 36 is changed to the S-shaped wave signal 35. This S-shaped wave signal 35 is output from the terminal 34. Moreover, the S-shaped wave signal, just suitable for the aspheric surface of face plate, can be formed by connecting several diodes in series or parallel in accordance with the input sensitivity characteristic of the balanced modulator 13.

Figures 4A, 4B, 4C, 4D:
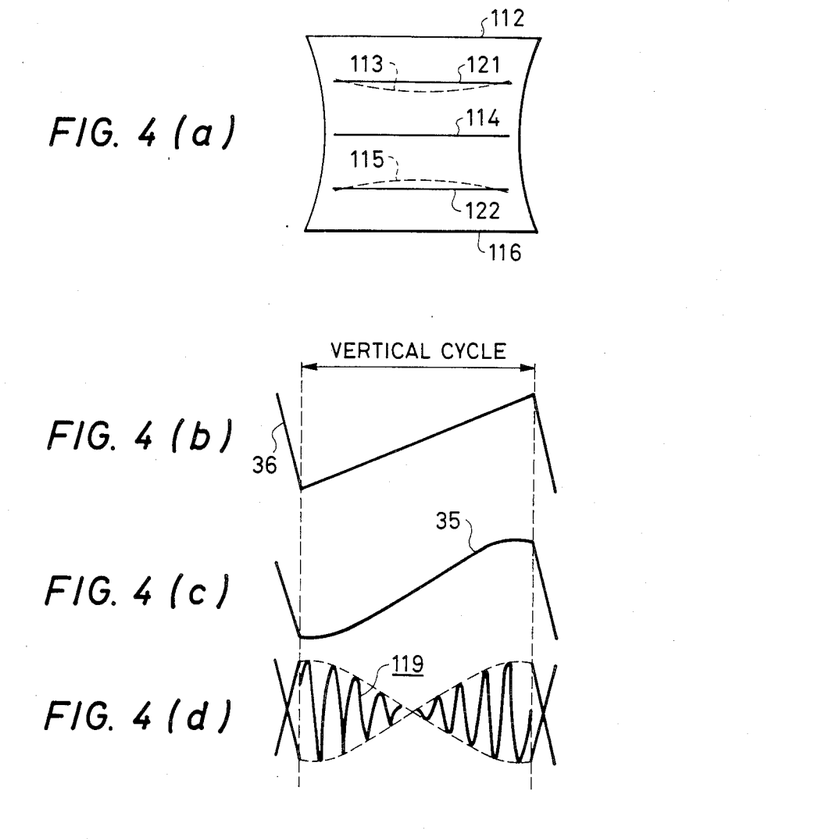
FIG. 4 indicates the patterns of scanning lines corrected by the top and bottom pincushion distortions correcting circuit of the present invention and waveforms of respective signals.

Namely, the saw wave signal 36 indicated as FIG. 4(b) becomes the S-shaped wave signal 35 as indicated as FIG. 4(c) in the wave shaping circuit 12. In the balanced modulator 13, an output signal of the horizontal waveform combining circuit 11 is balance-modulated by the S-shaped wave signal 35. Thereby, the modulation signal 119 of FIG. 4(d) is supplied to the vertical deflection circuit 14 from the balanced modulator 13. The S-shaped wave signal 35 shows large inclination for the electron beam which scans the part in large change of radius of curvature of face plate of picture tube 15, namely for the scanning lines 113, 115 but small inclination for the scanning lines 112, 116 at the peripheral part. Therefore, distortions of scanning lines 113, 115 are corrected and the scanning lines 121, 121 without distortions can be obtained.

As explained earlier, the embodiment of the present inventon is capable of perfectly correcting the top and bottom picushion distortions of raster scanned on the picture tube having the aspheric surface.

Figure 7:
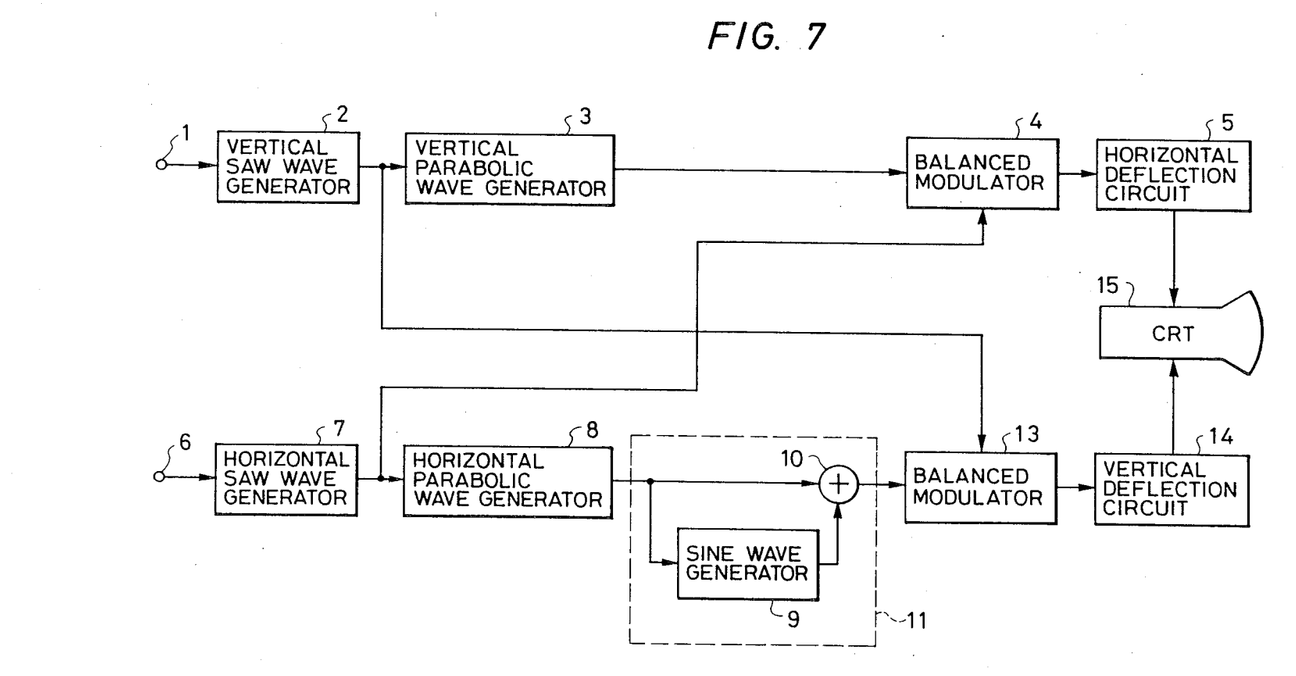
FIG. 7 and FIG. 8 are circuit diagrams of the second and third embodiments of the present invention.
Figure 8:
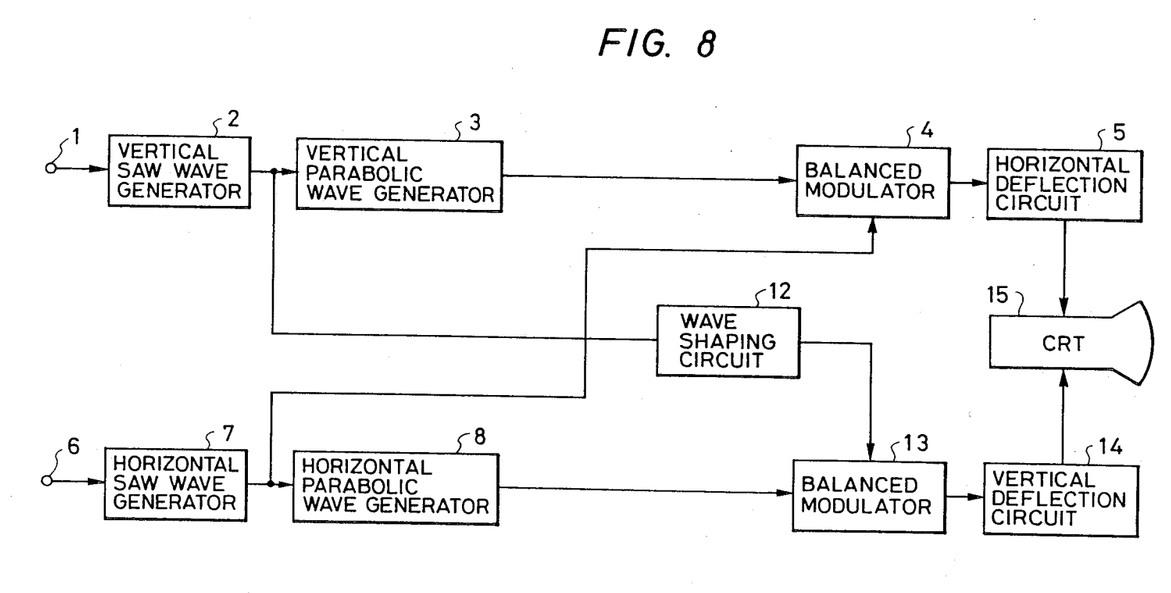

If, for example, the picture tube has the aspheric surface only in the vertical or horizontal direction, both wave shaping circuit 13 and horizontal wave combining circuit 11 are not required in the embodiment of the present invention and only the one of them is necessary. These circuits are shown in FIG. 7 and FIG. 8.

According to the present invention, the top and bottom pincushion distortions may be corrected sufficiently by adequately setting a degree of correction in accordance with difference in degree of correction for the center and peripheral portions of to and bottom pincushion distortions of raster scanned on the picture tube having the face plate of aspheric surface.

In addition, the top and bottom pincushion distortions correcting circuit of the present invention can also be adopted to the picture tube having the face plate of constant radius of curvature. In this case, it is also possible to further suppress residual distortion.

We claim:

1. A top and bottom pincushion distortions correcting circuit to be used suitably for the vertical deflection circuit of a television receiver utilizing the picture tube having the face plate of aspherical surface, comprising:

(a) a horizintal saw wave signal generator which generates a horizontal saw wave signal synchronized with a horizontal synchronous signal, (b) a horizontal parabolic wave signal generator which is connected to said horizontal saw wave signal generator, supplies the horizontal saw wave signal therefrom and converts the horizontal saw wave signal to a horizontal parabolic wave signal, (c) a signal combining circuit, comprising a sine wave generator and an adder circuit, which is connected to said horizontal parabolic signal generator and supplied therefrom by the horizontal parabolic signal, wherein said sine wave generator generates the sine wave signal of horizontal cycle from the horizontal parabolic wave signal and said adder circuit adds the horizontal parabolic signal and the sine wave signal with adequate rate and generates the added combining signal, (d) a vertical saw wave signal generator which generates a vertical saw wave signal synchronized with a vertical synchronous signal, (e) a waveform shaper which is connected to said vertical saw wave signal generator, supplied therefrom by the vertical saw wave signal and converts the vertical saw wave signal to an S-shaped wave signal, and (f) a balanced modulator which is connected to the signal combining circuit and waveform shaper, supplied by a combining signal from the signal combining circuit, supplied by the S-shaped wave signal from the waveform shaper, generates a modulation combining signal modulated by the S-shaped wave signal and supplies the modulation combining signal to the vertical deflection circuit.

2. A top and bottom pincushion distortions correcting circuit according to claim 1, wherein said sine wave generator of said signal combining circuit comprises:
 a phase lead circuit which is supplied by a horizontal parabolic signal and leads the phase of horizontal parabolic signal, and
 a resonance circuit which is connected to the phase lead circuit, supplied therefrom by the horizontal parabolic signal leading in the phase, resonates with the horizontal frequency and generates a sine wave signal of horizontal cycle.

3. A top and bottom pincushion distortions correcting circuit according to claim 1, wherein said waveform shaper comprises:
 an input terminal to which a vertical saw wave is supplied from a vertical saw wave generator,
 a resistor connected to said input terminal,
 a pair of diodes having first and second diodes conected in parallel with reversed polarities and connected between said resistor and common potential, and
 an output terminal connected between said resistor and pair of diodes.

4. A top and bottom pincushion distortions correcting circuit for correcting top and bottom pincushion distortions of raster scanned on the face plate of a picture tube comprising:
 (a) a horizontal saw wave signal generator which generates a horizontal saw wave signal synchronized with a horizontal synchronous signal,
 (b) a horizontal parabolic wave signal generator which is connected to said horizontal saw wave signal generator, supplied therefrom by the horizontal saw wave signal and converts the horizontal saw wave signal to a horizontal parabolic wave signal,
 (c) a signal combining circuit further comprising a sine wave signal generator and an adder circuit, being connected to said horizontal parabolic signal generator and is being supplied therefrom by the horizontal parabolic signal, wherein said sine wave signal generator generates a sine wave signal of horizontal cycle from the horizontal parabolic signal and said adder circuit addes the horizotnal parabolic signal and sine wave signal with adequate rate and generates the added combining signal,
 (d) a vertical saw wave signal generator which generates a vertical saw wave signal synchronized with a vertical synchronous signal, and
 (e) a balanced modulator which is connected to a signal combining circuit and a vertical saw wave signal generator, supplied by a combining signal from the signal combining circuit, supplied by the vertical saw wave signal from the vertical saw wave generator, generates a modulation combining signal modulated by the vertical saw wave signal and then supplies the modulation combining signal to the vertical deflection circuit.

5. A top and bottom pincushion distortions correcting circuit according to claim 1, wherein said sine wave signal generator of said signal combining circuit further comprises:
 a phase lead circuit which is supplied by a horizontal parabolic signal and leads the phase of horizontal parabolic signal and
 a resonance circuit which is connected to the phase lead circuit, supplied therefrom by the horizontal parabolic signal leading in the phase, resonates on the horizontal frequency and generates a since wave signal of horizontal cycle.

6. A top and bottom pincushion distortions correcting circuit for correcting the top and bottom pincushion distortions of raster scanned on the face plate of a picture tube comprising:
 (a) a horizontal saw wave signal generator which generates a horizontal saw wave signal synchronized with a horizontal synchronous signal,
 (b) a horizontal parabolic wave signal generator which is connected to said horizontal saw wave signal generator, supplied therefrom by the horizontal saw wave signal and converts the horizontal wave signal to a horizontal parabolic wave signal,
 (c) a vertical saw wave signal generator which generates a vertical saw wave signal synchronized with a vertical synchronous signal,
 (d) a waveform shaper which is connected to said vertical saw wave signal generator, supplied therefrom by the vertical saw wave signal and converts the vertical saw wave signal to an S-shaped wave signal, the waveform shaper including a resistor connected to the vertical saw wave generator and a pair of diodes connected in parallel with reverse polarities and being connected to the resistor, and
 (e) a balanced modulator which is connected to the horizontal parabolic wave generator and the waveform shaper, supplied by the horizontal parabolic wave signal from the horizontal parabolic wave signal generator, supplied by the S-shaped wave signal from the waveform shaper, generates the modulation parabolic signal modulated by the S-shaped wave signal and supplies the modulation parabolic wave signal to a vertical deflection circuit.

7. A top and bottom pincushion distortions correcting circuit according to claim 6, wherein said waveform shaper further comprises:
an input terminal to which the vertical saw wave signal is supplied from the vertical saw wave generator,
said resistor being connected to said input terminal,
said pair of diodes comprising first and second diodes connected in parallel with reverse polarities and connected between said resistor and common potential, and
an output terminal connected to the connecting point of said resistor and said pair of diodes.

* * * * *